United States Patent Office 3,429,205
Patented Feb. 25, 1969

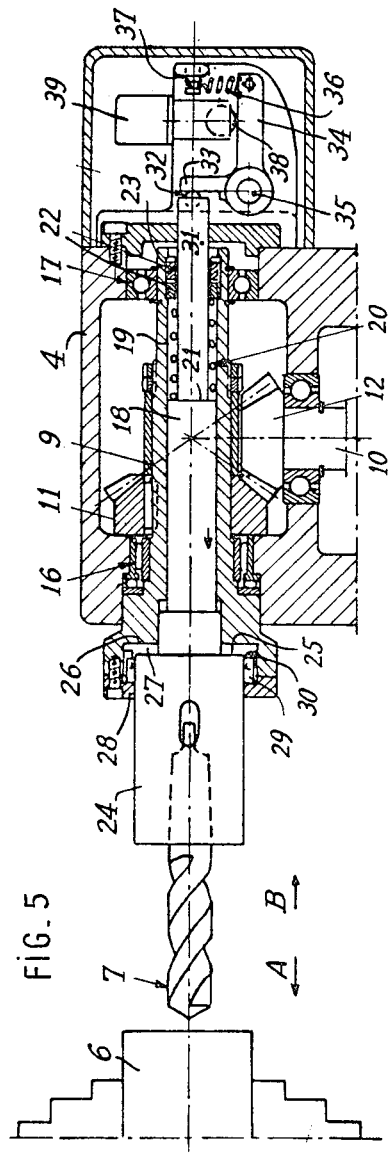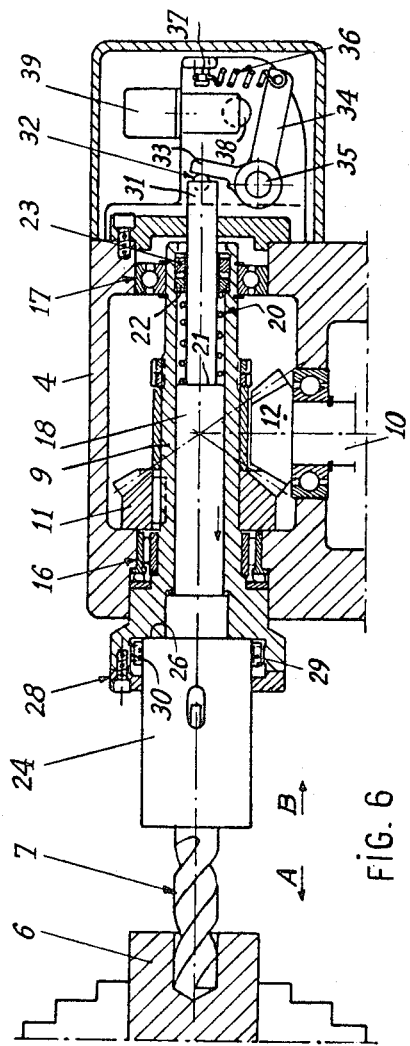

3,429,205
MACHINING DEVICE HAVING SELECTIVELY CONTROLLED FEED SPEEDS
Jules Louis Jeanneret, 13, 21 Rue Henri-Gelin, Niort, France
Filed Nov. 24, 1965, Ser. No. 509,481
Claims priority, application France, Nov. 26, 1964, 996,330
U.S. Cl. 77—32.7     3 Claims
Int. Cl. B23b 47/24

ABSTRACT OF THE DISCLOSURE

A machining device in which a tool can be moved towards and into a workpiece respectively at two different feed rates, the tool being moved longitudinally between two limit positions against resilient means upon contact of the tool and workpiece and actuating a switch to actuate means for changing the tool feed rate.

---

The present invention relates to a machining device with a selective feed control.

The machining device according to the invention is adaptable to any machine tool, such as a lathe, a drilling machine, a milling machine, and the like, and permits automatic selection between a high-speed machining feed and a slow-speed machining feed.

In the particular case of a drilling device mounted on the longitudinal slide of a lathe which has two speeds of displacement, namely a high-speed for moving the tool towards a workpiece or for disengaging the tool from the workpiece, and a slow-speed to feed the tool into the workpiece, the selection of the speed takes place automatically upon contact of the tool with the workpiece at the start of and, more particularly, in the course of the drilling, while the penetration of the drill does not affect the selected slow feed speed.

On the other hand, said device terminates the rapid-feed of the tool and activates the slow work feed, whatever the depth of the hole or of the surface to be machined when the tool contacts the workpiece.

In the case of a drilling operation, the rotary motion of the drill permits obtaining good drilling straightness since the bore is located in the axis of the workpiece.

It is an object to provide a machining device in which the feed speed is automatically controlled by contact of the tool with the workpiece.

The machine device according to the invention comprises a tool-carrying spindle rotatably driven by a motor which, independently of said rotary motion, is capable of moving longitudinally with respect to a supporting case for actuating an electrical switching device when the drill comes into contact with the workpiece to be machined. The electrical switching device controls, by appropriate means, the selection of the rapid feed and of the slow drilling feed.

The device according to the invention has first and second states of operation and is provided with first means for supporting a tool which is adapted for operating on a workpiece. The device further includes second means supporting the first means for displacement between first and second limit positions and third means urging the first means towards one of said positions. The first means is urged to the other of the positions against the action of the third means, by a condition of operation of the tool, and fourth means is provided which responds to the positions of the first means for controlling the states of operation of the device in respect of said positions.

A feature of the above construction contemplates that the first means includes a spindle which is adapted for supporting the tool and which is displaceable in a case between said first and second positions. The fourth means comprises a pivotally supported member in the case located adjacent the spindle and in contact therewith for assuming first and second positions in correspondence with the first and second positions of the spindle, and electrical switching means adjacent the pivotally supported member for responding to the positions thereof to control the states of operation of the device in accordance with said positions.

Other features and advantages of the present invention will become apparent from the following description of an embodiment of the invention given by way of example only with reference to the accompanying drawing, in which:

FIGURE 5 is a cross-section taken along line V—V of FIG. 2 showing the details of a drilling device when the drill is disengaged from the piece to be machined; and FIGURE 6 shows the device of FIG. 5, in which the drill is engaged in the workpiece.

Figure 1:
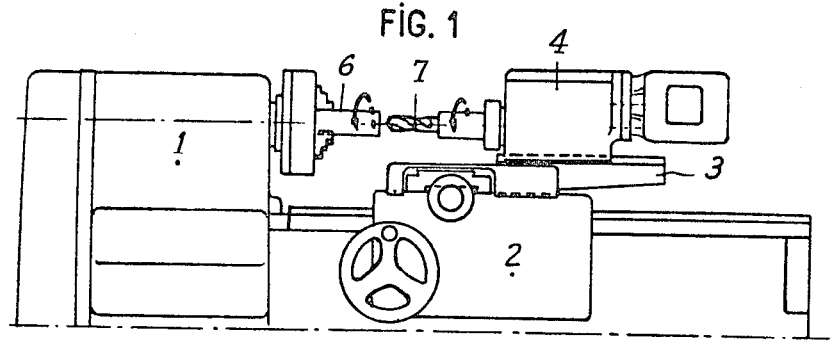
FIGURE 1 is an elevational view of a lathe whose longitudinal slide carries a drilling device according to the invention.
Figure 2:
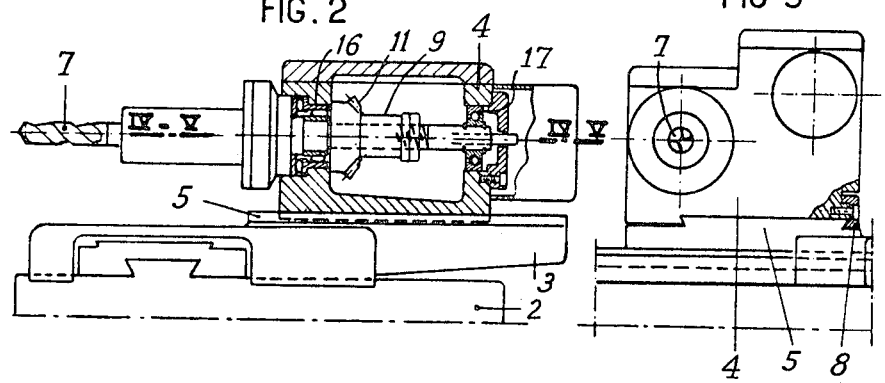
FIGURE 2 is a partial cross-section taken along line II—II of FIG. 4 of a drilling device according to the invention.
Figure 3:
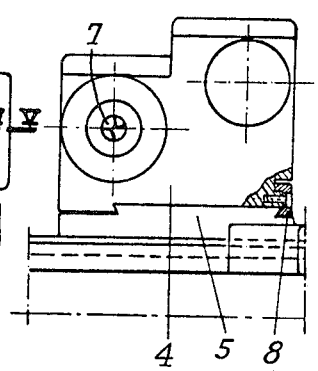
FIGURE 3 is a side view from the left side of the device of FIG. 2.
Figure 4:
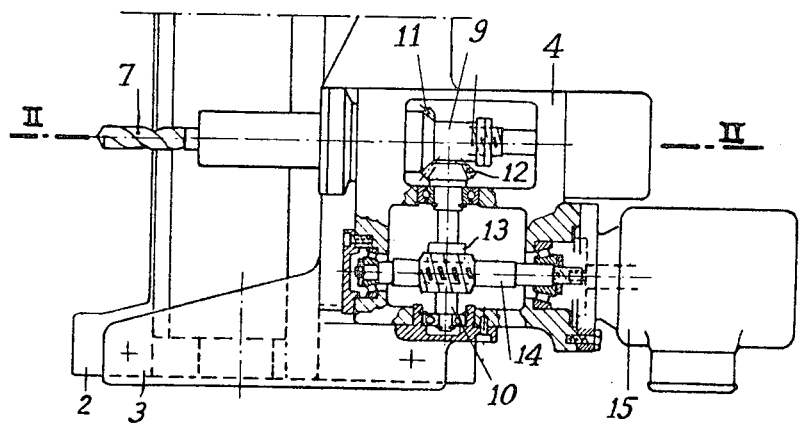
FIGURE 4 is a partial cross-section taken along the line IV—IV of FIG. 2.

Referring to FIG. 1, therein is shown a lathe 1 comprising a longitudinal slide 2, on which are mounted a bed-plate 3 and a case 4 containing means by which the drilling device can be actuated according to the invention. The case 4 is slidingly mounted on a slideway 5 (FIGS. 2 and 3) by which it is adjustable longitudinally with respect to the bed-plate 3, notably for the use of various tools mounted on the slide 2, or for adjusting the position of the case 4 relative to the length of the workpiece 6 and of the drill 7. Fixed laterally on the case 4 is a clamp 8 which is in engagement with one of the edges of the slideway 5 and firmly connects the case 4 to the bed-plate 3.

Rotatably mounted in the case 4, in the bearings 16, 17, is one of the ends of a shaft 9 which carries a drill 7 at its free remote end. The bearing 16 is provided to resist the axial stress resulting from the penetrating feed of the drill 7 in the workpiece 6 to be machined.

Said shaft 9 is rotatably driven by a shaft 10 by means of conical pinions 11, 12, said shaft 10 carrying a tangential wheel 13 which meshes with an endless screw 14, whose axis is parallel to the axis of the spindle 9 and which is coupled to the shaft of a motor 15 fixed on the case 4.

In FIGS. 1 to 4, the machining dveice is shown without its selective feed control members, which are shown in detail in FIGS. 5 and 6.

In FIG. 5 the drilling device is shown in a position in which the drill is disengaged from the workpiece 6 to be machined. The drilling device comprises a spindle 18 which is slidingly mounted in a bore 19 of the shaft 9 and wherein said spindle moves coaxially within the shaft 9 against the action of an elastic member constituted by helical spring 20 which abuts at one side against a shoulder 21 of the spindle 18 and at the other side against externally threaded adjustable rings 22, 23 which are screwed into the shaft 9.

At one of its ends 24, the spindle carries the drill 7 which is fixed, in a manner known per se, in said spindle 18, by a conical attachment and driving lug.

The end 24, whose diameter is greater than the body of the spindle 18, has a shoulder 25 which is adapted for contacting the bottom surface 26 of a cylindrical recess 27 formed in the shaft 9 and closed by a cover 28.

The portion of the end 24 of the spindle located in said recess 27 has an outer toothing 29 which meshes with an inner toothing 30 formed in the cylindrical wall of the recess 27 of the shaft 9, in such a manner that the shaft 9 rotatably drives, by means of teeth 29, 30 the spindle 18 and consequently the drill 7, which is fixed on said spindle. The toothing 29 which is integral with the spindle 18, whose width is smaller than the width of the recess 27, is capable of sliding inside said recess with respect to the toothing 30 and thereby allow a longitudinal sliding of the spindle 18 with respect to the hollow shaft 9, while ensuring at the same time the rotatable driving of the spindle 18.

At the end 31 of the spindle which is opposite the end which carries the drill 7, there is provided a seated ball 32, against which bears a finger 33 integral with a lever 34 articulately mounted on an axle 35 which extends perpendicular to the axis of the spindle 18. The finger 33 is kept in engagement with the ball 32 in the spindle 18 by the action of a helical spring 36, which is secured at one end to the end of the lever 34 and, at the other end to a stud 37 integral with the case 4. Due to the action of the spring 36, the lever 34 is capable of contacting, with a median portion, a control member 38 of a switch 39 fixed to the case 4.

Said switch 39 controls, in a manner known per se, the rapid feed and the work feed of the longitudinal slide 2 of the lathe 1.

The drilling device according to the present invention operates in the following manner: since the spindle 18 is rotatably driven by the shaft 19 by means of the teeth 29, 30, and since the shaft 19, in turn, is driven by the motor 15 by means of the endless screw 14 of the tangential wheel 13 of the shaft 10 and by the coupling of conical pinions 11, 12, the drill 7 can assume the approach position shown in FIG. 5, in which it is not in contact with the piece to be machined 6. Due to the action of the spring 20, the spindle 18 abuts, with its toothing 29, against the cover 28 integral with the shaft 9, and the lever 34, acted on by the spring 36, bears against the control member 38 of the switch 39 which, in this position, enables rapid feed of the drill 7 in the direction of the arrow A when the operator requires.

As soon as the drill 7 comes into contact with the workpiece 6, the spindle 18, which is rigidly connected to the drill 7, is immobilized in the longitudinal direction, whereas the case 4 and the shaft 9 continue to advance while compressing the spring 20. The end 24 of the spindle 18 is displaced in the recess 27 until its shoulder 25 bears against the bottom surface 26 of said recess 27, thereby ensuring firm longitudinal engagement of the spindle with the shaft 9.

When the spindle 18 is being displaced with respect to the hollow shaft 9, the spindle 18, by means of the ball 32, pushes the finger 33 rearwardly and causes the lever 34 to rock around axle 35 against the action of the spring 36, to the position as shown in FIG. 6. The movement of the lever 34 releases the same from contact with the control member 38 of the switch 39, and the latter controls the selection of feeds by suitable electrical means, in such a manner that the feed of the tool which was rapid is changed so as to correspond to a slow work speed.

As soon as the drilling has been carried out to the desired depth in the workpiece 6, or in order to evacuate the turnings or borings when carrying out a deep drilling operation which is effected in several stages, the slide 2 is actuated in the direction of the arrow B to cause withdrawal of the drill. The drill which moves out of contact with the workpiece 6, and due to the expansion action of the spring 20, the spindle 18 is displaced in the direction of the arrow A until it comes into contact with the cover 28 by its toothing 29. When executing its sliding movement, the spindle 18 allows the lever 34 to rock under the action of the spring 36 and to again come into contact with the control member 38, so as to actuate the switch 39, which causes the slide 2 carrying the machining device to change from a slow return motion to a rapid return motion.

The preceding machining cycle is then repeated in the same manner as described above.

It is understood that the device, which is mounted on a lathe in the above-described embodiment, can be applied to any other machine-tool, such as a drilling machine, or a milling machine, and that the drilling device can be replaced with any other machining device, such as, for example, a milling device.

It is also understood that the present invention is not limited to the embodiment described and illustrated herein, but that it covers all possible variation thereof within the scope of the attached claims.

What is claimed is:

1. In a machining device having a first tool feed rate and a second tool feed rate controlled by electric switch means movable between a first position actuating said first rate and a second position actuating said second rate, said device comprising a supporting housing, a rotatably-driven, hollow shaft mounted in said housing, a cylindrical recess in said hollow shaft having a plurality of internal teeth, a tool support disposed within said hollow shaft, said tool support having an enlarged portion at one end and a plurality of external teeth on said enlarged portion, said cylindrical recess slidably receiving said external teeth for rotating said tool support and restricting longitudinal sliding movement of said tool support between first and second limits, resilient means urging said tool support toward said first limit, a pivotally supported member in said housing adjacent said tool support and having one portion in contact with said tool support and another portion engageable with said switch means whereby the electric switch means is actuated by said pivotally supported member in response to the longitudinal sliding movement of said tool support.

2. A device as claimed in claim 1 wherein said pivotally supported member is supported for pivotal movement about an axis perpendicular to the axis of said shaft and traversely offset therefrom.

3. A device as claimed in claim 2 comprising motor means secured to said housing for driving power and means between said motor means and said shaft for rotatably driving said shaft within said housing.

References Cited

UNITED STATES PATENTS

| 2,854,869 | 10/1958 | Hirvonen | 77—32.7 |
| 3,273,182 | 9/1966 | McDonald | 77—32.7 X |

FOREIGN PATENTS

| 167,677 | 8/1921 | Great Britain. |
| 344,280 | 3/1960 | Switzerland. |

FRANCIS S. HUSAR, Primary Examiner.

U.S. Cl. X.R.

77—32.8